United States Patent

Slavicek et al.

(10) Patent No.: US 10,320,935 B2
(45) Date of Patent: Jun. 11, 2019

(54) CACHE DATA VALIDATION

(71) Applicant: Red Hat, Inc., Raleigh, NC (US)

(72) Inventors: Pavel Slavicek, Brno (CZ); Rostislav Svoboda, Rosice (CZ)

(73) Assignee: RED HAT, INC., Raleigh, NC (US)

( * ) Notice: Subject to any disclaimer, the term of this patent is extended or adjusted under 35 U.S.C. 154(b) by 728 days.

(21) Appl. No.: 14/607,481

(22) Filed: Jan. 28, 2015

(65) Prior Publication Data
US 2016/0219123 A1 Jul. 28, 2016

(51) Int. Cl.
H04L 29/08 (2006.01)
G06F 12/0808 (2016.01)
G06F 16/957 (2019.01)

(52) U.S. Cl.
CPC ...... H04L 67/2852 (2013.01); G06F 12/0808 (2013.01); G06F 16/9574 (2019.01); H04L 67/02 (2013.01); G06F 2212/608 (2013.01)

(58) Field of Classification Search
CPC ............ G06F 17/301; G06F 17/3089; G06F 21/6227; G06F 3/061; G06F 12/0815; G06F 2212/608; H04L 41/082; H04L 67/2852; H04L 67/02
USPC .................. 709/201–204, 217, 221
See application file for complete search history.

(56) References Cited

U.S. PATENT DOCUMENTS

| | | | | |
|---|---|---|---|---|
| 6,438,653 B1* | 8/2002 | Akashi | ............... | G06F 12/0831 711/128 |
| 6,681,292 B2* | 1/2004 | Creta | ................. | G06F 12/0802 709/217 |
| 7,496,637 B2* | 2/2009 | Han | .................... | G06F 17/3089 709/217 |
| 8,375,185 B1* | 2/2013 | Hanson | .................. | G06F 12/14 380/264 |

(Continued)

FOREIGN PATENT DOCUMENTS

WO WO2014141144 A2 9/2004
WO WO2014165967 A1 10/2004

OTHER PUBLICATIONS

Anirudh Bhatnagar. "*HTTP Caching using JAX-RS*" Aug 24, 2013 http://xebee.xebia.in/index.php/2013/08/24/http-caching-using-jax-rs/.

(Continued)

*Primary Examiner* — Michael C Lai
(74) *Attorney, Agent, or Firm* — Haynes and Boone, LLP

(57) ABSTRACT

A method includes, with a computing system, receiving a first resource request for a Representational State Transfer (REST) web service, in response to determining that a resource request result of the first resource request is not cached, passing the first resource request to the REST web service, receiving from the REST web service, the resource request result and metadata associated with the resource request result, the metadata indicating a set of entities associated with the resource request result, caching the result and storing the metadata with the cached result, receiving a (Continued)

second resource request, the second resource request being the same as the first resource request, in response to determining that an entity from the set of entities has changed since the resource request result was cached, invalidating the cached resource request result and passing the first resource request to the REST web service.

15 Claims, 5 Drawing Sheets

(56) References Cited

U.S. PATENT DOCUMENTS

| | | | |
|---|---|---|---|
| 8,438,295 B2* | 5/2013 | Shukla | G06F 21/6227 709/203 |
| 8,620,774 B1* | 12/2013 | Li | G06Q 30/06 705/27.1 |
| 8,620,870 B2* | 12/2013 | Dwarampudi | G06F 11/1448 707/665 |
| 8,655,989 B2 | 2/2014 | Ritter et al. | |
| 8,656,468 B2* | 2/2014 | Ponnath | G06F 21/52 726/10 |
| 8,898,175 B2 | 11/2014 | Zenger et al. | |
| 9,250,811 B1* | 2/2016 | Patiejunas | G06F 3/061 |
| 9,251,003 B1* | 2/2016 | Gupta | G06F 11/1469 |
| 9,444,752 B2* | 9/2016 | Backholm | H04L 47/32 |
| 9,559,889 B1* | 1/2017 | Vincent | H04L 29/08522 |
| 9,652,405 B1* | 5/2017 | Shain | G06F 12/122 |
| 2003/0041093 A1* | 2/2003 | Yamane | G06F 11/0709 709/201 |
| 2003/0041094 A1* | 2/2003 | Lara | G06F 11/0709 709/201 |
| 2003/0120730 A1* | 6/2003 | Kuno | H04L 29/06 709/204 |
| 2005/0120025 A1* | 6/2005 | Rodriguez | G06F 17/30073 |
| 2005/0246717 A1* | 11/2005 | Poole | G06F 9/4425 719/316 |
| 2007/0074215 A1* | 3/2007 | Bethea | H04L 67/02 718/101 |
| 2008/0288547 A1* | 11/2008 | Brodsky | G06F 17/3089 |
| 2009/0119672 A1* | 5/2009 | Bussard | G06F 9/468 718/104 |
| 2010/0077461 A1* | 3/2010 | Nguyen | G06F 21/41 726/5 |
| 2010/0199042 A1* | 8/2010 | Bates | G06F 11/2064 711/114 |
| 2010/0325264 A1* | 12/2010 | Crowder | G06F 15/173 709/224 |
| 2010/0332401 A1* | 12/2010 | Prahlad | G06F 17/30082 705/80 |
| 2011/0161723 A1* | 6/2011 | Taleck | G06F 17/30156 714/4.11 |
| 2011/0235538 A1* | 9/2011 | Manav | H04N 5/4401 370/252 |
| 2014/0033170 A1* | 1/2014 | Nimashakavi | G06F 17/30893 717/120 |
| 2014/0189136 A1* | 7/2014 | Bryan | H04L 29/06326 709/228 |
| 2014/0237087 A1* | 8/2014 | Elias | H04L 67/16 709/220 |
| 2014/0280919 A1* | 9/2014 | Lakes | G06Q 30/0601 709/224 |
| 2014/0316807 A1* | 10/2014 | Romatoski | G06F 19/321 705/3 |
| 2014/0372970 A1* | 12/2014 | Broussard | G06F 8/30 717/106 |
| 2015/0019637 A1* | 1/2015 | Backholm | H04L 47/32 709/203 |
| 2015/0019686 A1* | 1/2015 | Backholm | H04L 47/32 709/217 |
| 2015/0033305 A1* | 1/2015 | Shear | G06F 21/45 726/6 |
| 2015/0263977 A1* | 9/2015 | Nair | H04L 47/70 709/226 |
| 2015/0269624 A1* | 9/2015 | Cheng | G06Q 30/0267 705/14.58 |
| 2016/0164722 A1* | 6/2016 | Zhu | H04L 41/082 709/221 |
| 2016/0248875 A1* | 8/2016 | Frerking | G06F 11/2023 |

OTHER PUBLICATIONS

"*Apache Wink Version 1.0 Developer Guide*" Oct. 15, 2009 https://wink.apache.org/1.0/Apache_Wink_User_Guide.pdf.
"RESTEasy JAX-RS" http://docs.jboss.org/resteasy/docs/3.0.1.Final/userguide/html_single/.

* cited by examiner

CACHE DATA VALIDATION

BACKGROUND

The present disclosure relates generally to web services, and more particularly to cache systems for web services.

Web services can be designed using various protocols and various architectural patterns. One type of architectural pattern for web services is a Representational State Transfer (REST) web service, sometimes referred to as a RESTful web service. The REST architecture pattern includes a set of guidelines for creating web services to communicate with each other using a shared common communications protocol, particularly, Hypertext Transfer Protocol (HTTP). Web browsers use HTTP verbs such as GET, POST, PUT, DELETE etc. to retrieve and display web pages from remote servers. REST web services use similar commands when communicating with devices.

Web services provide a variety of services to client systems. A REST web service provides resources such as data and operations in the form of Uniform Resource Identifiers (URIs). In other words, a client system accesses a resource such as a piece of data or an operation by using a URI, typically in the form of a web link. Generally, multiple clients make several requests for resources to a REST web service. The data that forms those resources may regularly be changing. It is desirable to improve the speed and efficiency at which resources are provided to client systems.

SUMMARY

According to one example, a method performed by a computing system includes, with the computing system, caching, within a cache module of the computing system, a resource request result from a Representational State Transfer (REST) web service, with the computing system, storing, within an entity register, metadata associated with the resource request result, the metadata including a set of entities used to produce the resource request result, with the computing system, receiving from a client, a first resource request for the REST web service, the first resource request corresponding to the resource request result, with the computing system, in response to determining that the resource request result is cached within the cache module, checking the entity register associated with the resource request result, and with the computing system, in response to determining that an entity from the set of entities has changed since the resource request result was cached, invalidating the cached resource request result and passing the first resource request to the REST web service.

According to one example, a system includes a Representational State Transfer (REST) web service, and a cache module configured to: cache a resource request result from the REST web service, store within an entity register associated with the cache module, metadata for the resource request result, the metadata including a set of entities associated with the resource request result, receive from a client, a first resource request for the REST web service, the first resource request corresponding to the resource request result, in response to determining that the resource request result is cached within the cache module, check the entity register associated with the resource request result, and in response to determining that an entity from the set of entities is has changed since the resource request result was cached, invalidate the cached resource request result and passing the first resource request to the REST web service.

According to one example, a method includes, with a computing system, receiving a first resource request for a Representational State Transfer (REST) web service, with the computing system, in response to determining that a resource request result of the first resource request is not cached, passing the first resource request to the REST web service, with the computing system, receiving from the REST web service, the resource request result and metadata associated with the resource request result, the metadata indicating a set of entities associated with the resource request result, with the computing system, caching the result and storing the metadata with the cached result, with the computing system, receiving a second resource request, the second resource request being the same as the first resource request, with the computing system, in response to determining that an entity from the set of entities has changed since the resource request result was cached, invalidating the cached resource request result and passing the first resource request to the REST web service.

Figure 1:
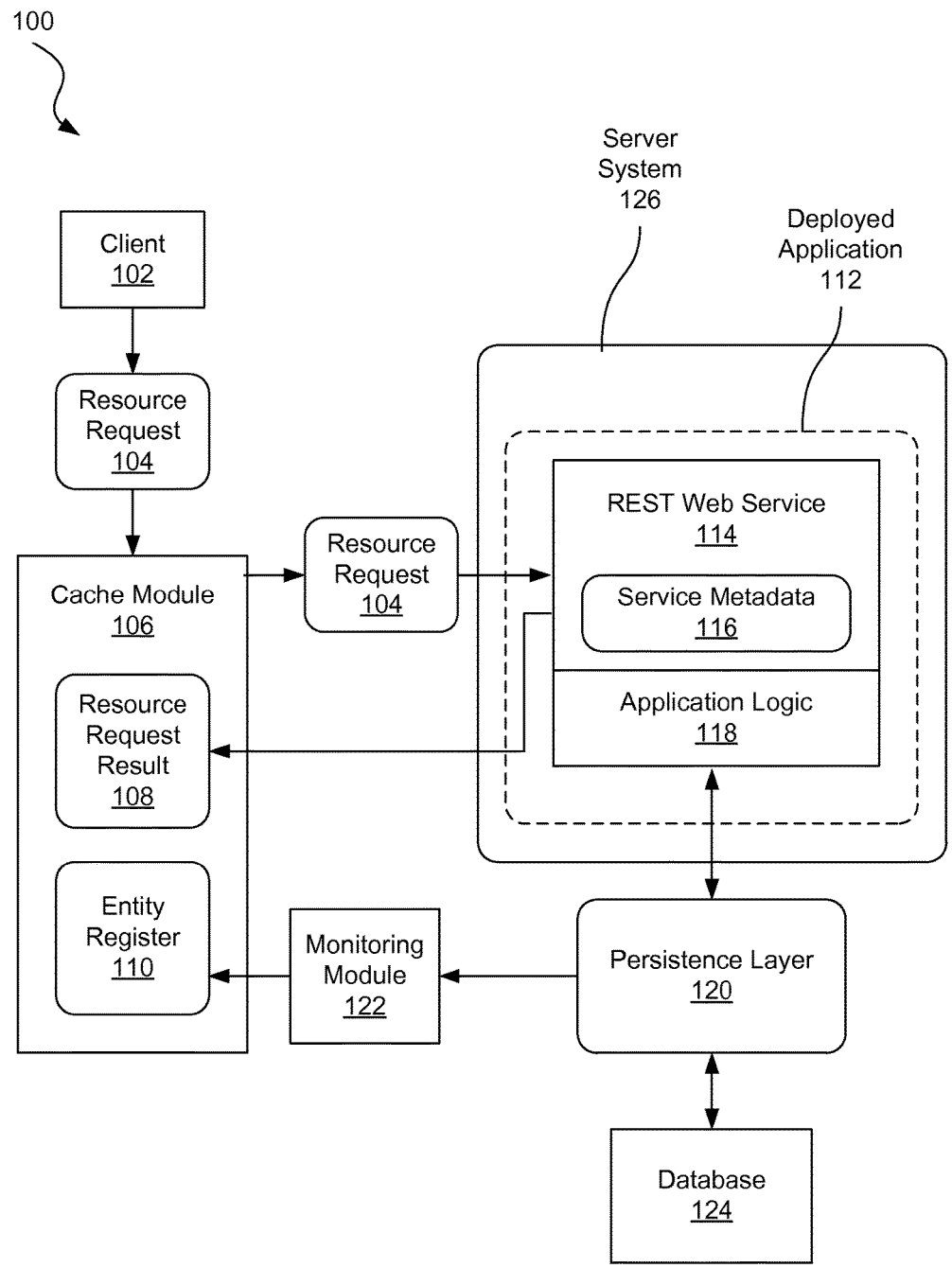
FIG. 1 is a diagram showing illustrative cache module for use with a REST web service, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the speed and efficiency at which resources are provided to client systems. One way to do so is through use of caching systems. A cache system temporarily and transparently stores data so that future requests for that data can be served faster. For example, if a particular client requests a resource, such as the result of a particular computation on a set of data, that result is placed in cache in addition to being returned to the client. Then, if that client, or a different client, makes the same request, the result is already stored in cache. Thus, the result can be provided faster because it does not have to be reprocessed.

Cache systems typically keep cached data for a particular period of time. After that time expires, the cached result is removed from the cache. But, REST web services may include many different channels that can affect data from which a cache result was derived. If the data from which a cache result was derived is updated, then that cached result is no longer valid. It is desirable to have a cache system that does not provide outdated results.

According to principles described herein, a cache module is designed to provide a cache result only if the data from which the cache result was derived is still valid. According to one example, when a request is processed by the REST web service, the result is placed in cache. Additionally, metadata for the result is also stored in the cache. The metadata includes a list of data objects (often referred to as entities), from which the cache result was derived. A list of such entities is stored in an entity register component of the cache module. The metadata for the entities can include a version number for each entity. A monitor module is also used to monitor changes to those entities. If an entity changes, then all cache results associated with that entity are invalidated. Thus, when a request is received by the cache, the cache module will determine whether a cached result is valid before returning the result to the client system that requested the result.

FIG. 1 is a diagram showing illustrative system 100 that includes a cache module 106 for use with a REST web service 114. According to the present example, the system 100 includes a client 102, a cache module 106, a monitoring module 122, and a server system 126.

The client 102 is a computing system that sends a resource request 104 to the REST web service 114. The client 102 may be in communication with a server system 126 that provides the web service 126 through a network such as the Internet. The client 102 may be a personal computing device such as a laptop, a tablet device, or a smartphone.

The resource request 104 may include a request for data or a request to perform operations on data. Some of that data may be included with the request. The resource request 104 may take the form of a URI such as a Uniform Resource Locator (URL). A URL is a web link that references a location over a network such as the Internet. The URI includes information that identifies both the web service 114 and the resource from the web service that is desired.

The web service 114 is configured such that requests sent from clients 102 to the REST web service 114 are first sent to the cache module 106. As described above, a cache temporarily stores previously processed results for quicker access. When the cache module 106 receives a resource request 104, it first checks to see if the resource request result 108 is stored within the cache. If so, then the resource request result 108 is returned to the client 102 that sent the resource request 104. If the resource request result is not cached (or invalid, as will be described in more detail below), then the resource request 104 is forwarded to the REST web service 114.

The resource request result 108 represents the result of the processing associated with the request. For example, a resource request 104 may request a specific operation be performed on a specific set of data objects. The result of such operation is then returned to the client 102. Additionally, that result is stored within the cache module 108 as the resource request result 108.

If the resource request 104 is forwarded to the REST web service 114, it will be forwarded to the server system 126 associated with the web service 114. The server system 126 may include one or more servers on which the application 112 associated with the web service 114 is deployed. The deployed application includes the REST web service 114 and the application logic 118.

The application logic 118 is the component of the deployed application 112 that includes code to perform the primary functions of the deployed application 112. For example, if the deployed application 112 is an invoice processing application, then the code to perform the invoice processing related functions is included within the application logic 118.

The REST web service 114 is the component of the deployed application that provides the web service aspect of the deployed application 112. For example, using the invoice processing application example, the REST web service 114 provides receives and responds to requests for invoice related data to remote clients 102. As described above, the web service 114 component follows the REST architectural pattern.

According to principles described herein, the REST web service is 114 is configured to collect service metadata 116. The service metadata 116 includes a list of entities that are used for a particular request. For example, a request may ask for an invoice that is produced by collecting information from multiple data objects. Each data object is considered an entity. This information will be used later to determine whether a cache result is still valid.

The entities from which a request may be processed may be stored in a database 124. The database 124 may be integrated with the server system 126. In some examples, the database 124 may be a separate computing system in communication with the server system 126.

A persistence layer 120 is used to ensure that data within the database 124 persists. In other words, when data within the database 124 is modified, it is not overwritten. Rather, a new version of that data is created. Thus, older versions of the data persist. The persistence layer 120 includes the logic for ensuring that the data persists. In one example, the persistence layer 120 is integrated with the database 124.

When the web service 114 receives a resource request 104, it will use the relevant data from the database to process the request and return the resource request result 108 to the client system that requested the resource. The web service 114 will also keep track of the entities used to create the resource request result 108. The resource request result 108 will be cached in the cache module 106 and the metadata for that result, which includes the list of entities used to produce the result 108, is also stored in the cache module.

In one example, the metadata regarding which entities were used to produce a result is stored in an entity register 110. The entity register is a portion of the cache memory that is used for storing the entity related metadata. A particular list of entities for a result is stored in such a manner so as to identify the resource request result 108 with which the list of entities is associated.

A monitoring module 122 is used to monitor changes to the data in the database that corresponds to entities referenced within the entity register 110. For example, if a particular entity that is used to produce a cached resource request result 108 gets updated, then the monitoring module can flag that entity as out of date. All resource request results that relied on that entity can then be invalidated because they are now based on outdated data. In one example, the monitoring module can be implemented using Aspect Oriented Programming (AOP). AOP is a programming style that seeks to modularize "aspects" of a program. Thus, the monitoring function would be considered an aspect and work with the persistence layer 120 to detect changes in the appropriate entities.

Figure 2:
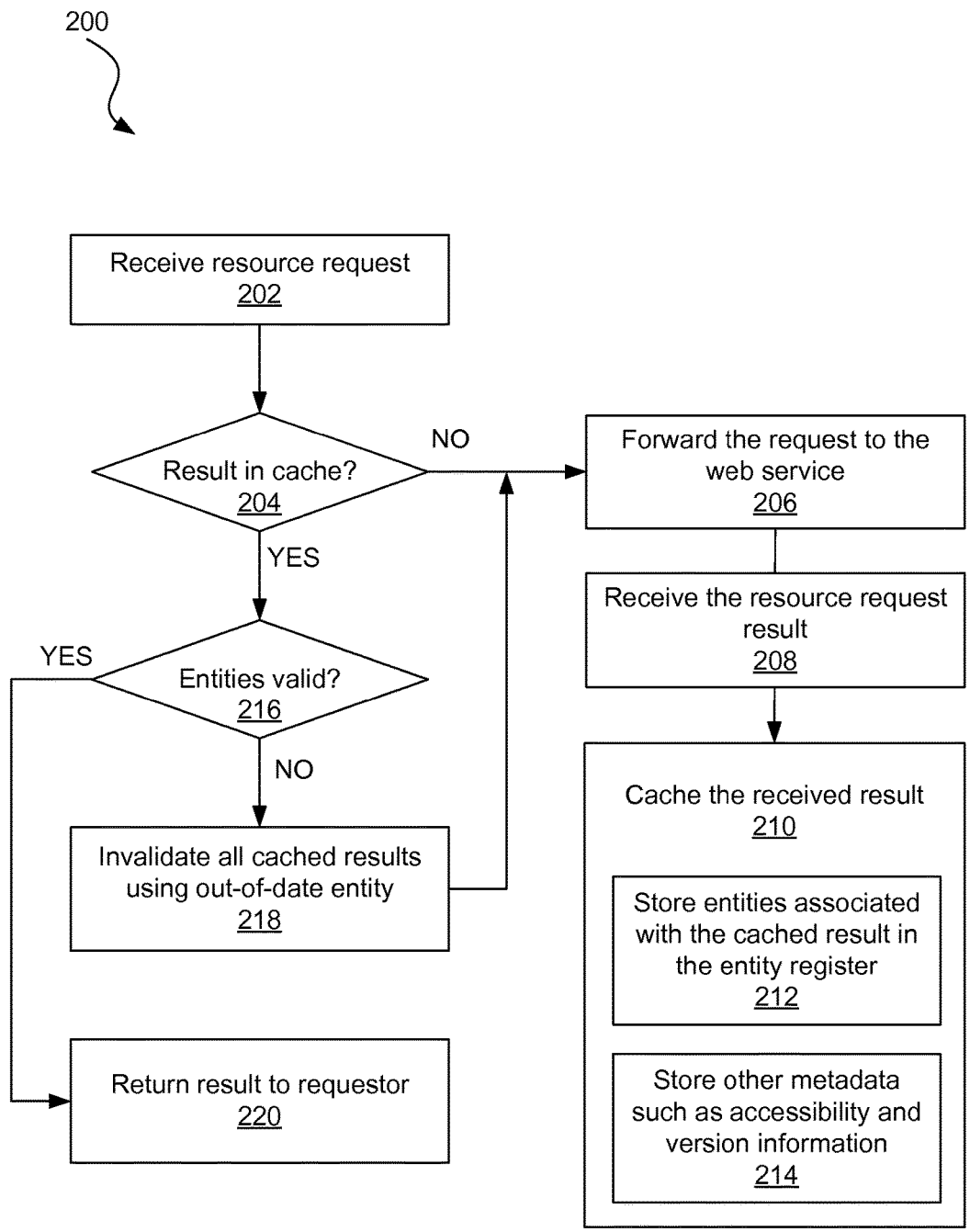
FIG. 2 is a flowchart showing an illustrative method for using the cache module and validating data from the cache module, according to one example of principles described herein.

FIG. 2 is a flowchart showing an illustrative method for using the cache module and validating data from the cache module. According to one example, the method 200 includes a step 202 for receiving a resource request. As described above, the resource request may be in the form of a URI. The request is received from a client system. The resource request may request a specific resource that involves operations on various entities.

At step 204, it is determined whether the result of the resource request is already in the cache. If the result is not in the cache (referred to as a cache miss), then the resource request is forwarded to the web service in step 206. The web service then processes the request and sends the result back to the cache module. At step 208, the cache module receives the resource request result from the web service.

At step 210, the cache module caches the received result. This step 210 involves more than just caching the actual result. Specifically, the step 210 includes a step 212 for storing references to entities associated with the cached result in the entity register.

At step 214, other metadata is stored with the cached result. Other metadata may include accessibility information. Some entities are private and thus only certain clients may have access to those entities. In some cases, an entity is specific to a client and thus only that client can access that entity. In such cases, if a request for a private cached result will result in a cache miss if an unauthorized client sends a similar request. Other metadata includes version number. The version number is one way in which it is determined that an entity is out of date. For example, if the entity version number associated with an entity reference in the entity register is different than the current version number in the database, it is known that the entity upon which a cached result was based is out of date. Thus, that cached result should be discarded.

If, at step 204, it is determined that the result for the resource request is in fact in the cache (referred to as a cache hit), then it is determined, at step 216, whether entities associated with that cache result are valid. Specifically, the list of entity references may have been marked as invalid by the monitoring module. If any of the entities is marked as invalid, then it is known that the cached result is no longer valid and should be discarded. Thus, at step 218, all cached results that are based on the outdated entity are invalidated. It may be the case that some results were cached after the entity was updated and thus do not have to be removed because they were based on updated data. The method then proceeds to step 206. Thus, even though there was a cache hit, it is treated as a cache miss because the cached result is based on outdated data.

If it is determined, at step 216, that all entities associated with the cached result are valid, then that result is returned to the client that requested that result. The cache module is transparent. Thus from the perspective of the client, the request was sent to the web service and the result was received from the web service. Because the result was cached, the result was received much faster than it would have been received had the request been processed by the web service.

Through use of methods and systems embodying principles described herein, a web service application can operate more efficiently. Specifically, because effective cache mechanisms can be used that still provide valid data from a REST web service, fewer requests have to be reprocessed, thus freeing up computing resources to process other requests. Moreover, client systems are often able to receive a response more quickly.

Figure 3A:
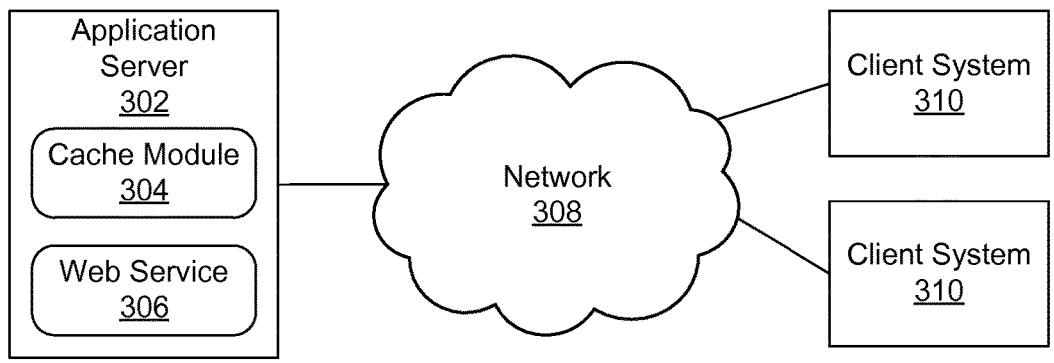
FIGS. 3A-3B are diagrams showing illustrative placement of a cache module for a REST web service, according to one example of principles described herein.
Figure 3B:
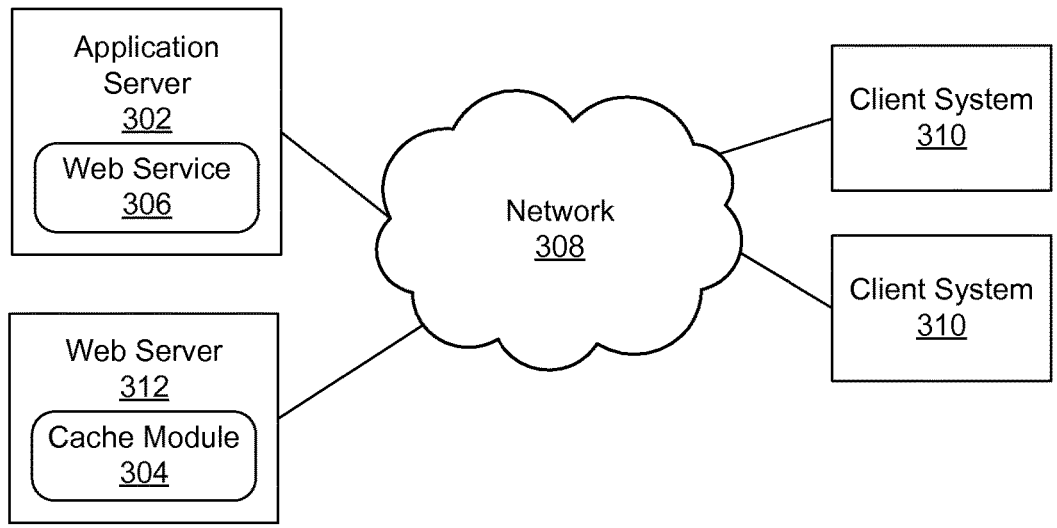

FIGS. 3A-3B are diagrams showing illustrative placement of a cache module for a REST web service. FIG. 3A illustrates an example in which the cache module 304 is integrated with the same server system as the web service 306. Thus, when client systems 310 request resources from the web service, the requests will go to the application server 302 and be handled first by the cache module 304 of the application server 302. While this increases the efficiency at which the cache module communicates with the persistence layer of the application server, it can reduce application server capacity.

FIG. 3B illustrates an example in which the web service 306 resides on the application server 302 and the cache module 304 resides on a different web server 312. The application server 302 is in communication with the web server 312 over a network 308. Thus, when a client 310 sends a request to the web service 306, that request is actually sent to the web server 312 first to be handled by the cache module 304. While this frees up the capacity of the application server, it requires additional overhead to communicate with the remote cache module 304.

The decision whether to use the setup of FIG. 3A or the setup of FIG. 3B may be based on various factors. For example, if there is a higher number of requests and a lower number of changes, then it may be beneficial to have the cache module 304 part of the web server 312 as illustrated in FIG. 3B. But, if there are fewer requests and more data changes, then it may be beneficial to have the cache module 304 integrated with the application server 302 as illustrated in FIG. 3A.

Figure 4:
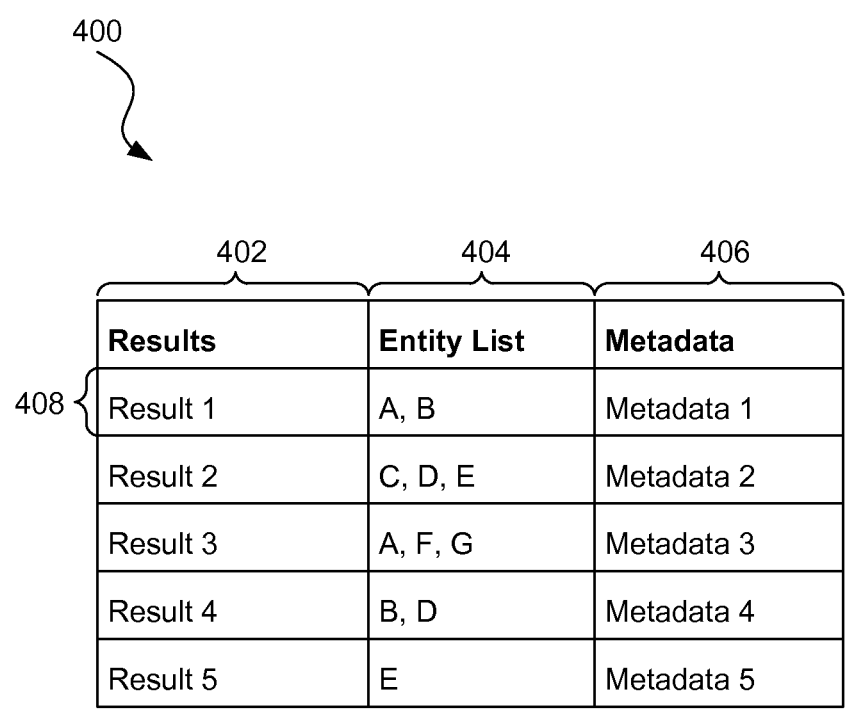
FIG. 4 is a diagram showing an illustrative table that shows the relationship of cached results and metadata, according to one example of principles described herein.

FIG. 4 is a diagram showing an illustrative table that shows the relationship of cached results and metadata. The table 400 is intended to show relationships of data and does not necessarily represent the data structure that is used to store results within the cache module.

According to the present example, the table includes a set of tuples 408 and three columns; a results column 402, an entity list column 404, and a metadata column 406. The results column indicates a result for a particular resource request, or URI. The results may be identified in a variety of manners. In one example, the results are identified by the URI that resulted in production of the corresponding result.

The entity list column 404 represents the list of entities that were used to create the corresponding result. Various results may have overlapping or identical sets of entities. For example, Result 1 is associated with entity A and entity B. Result 4 is associated with entity B and entity D.

The metadata column 406 includes additional metadata regarding the result. For example, the result may be private and thus restricted to a group of client devices or a specific client device. The additional metadata may also include information such as the version number of each entity within the entity list corresponding to the result.

Figure 5:
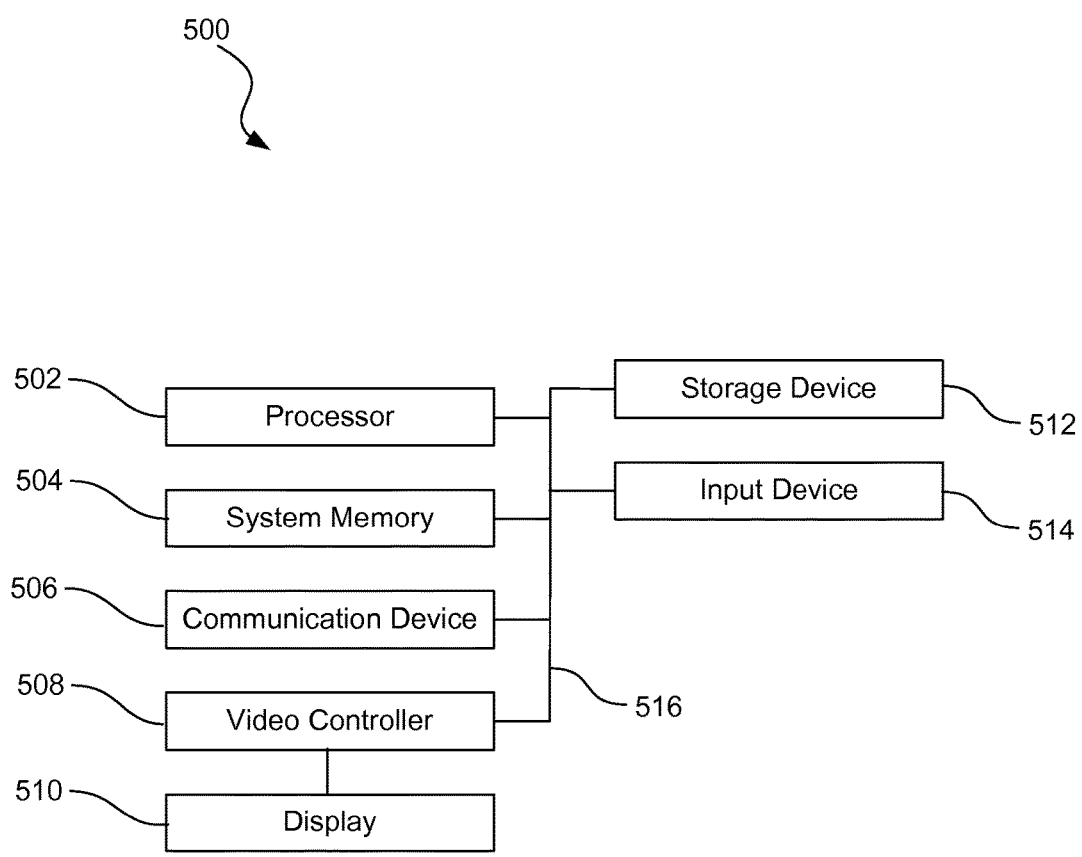
FIG. 5 is a diagram showing an illustrative computing system that may be used to perform cache functions, according to one example of principles described herein.

FIG. 5 is a diagram showing an illustrative computing system that may be used to perform cache functions. For example, the computing system may include components of a server system that implements the cache module. The computing system 500 may also correspond to systems that perform other functions described herein such as those of the web service or the monitoring module.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:

with the computing system, caching, within a cache module of the computing system, a resource request result from a Representational State Transfer (REST) web service;

with the computing system, storing, within an entity register, metadata associated with the resource request result, the metadata including a set of entities used to produce the resource request result, wherein the metadata further includes a version of each entity associated with the resource request result and accessibility of each entity associated with the resource request result;

with the computing system, receiving from a client, a first resource request for the REST web service, the first resource request corresponding to the resource request result;

with the computing system, in response to determining that the resource request result is cached within the cache module, checking, within the entity register, metadata associated with the resource request result; and with the computing system, in response to determining that an entity from the set of entities has changed since the resource request result was cached, invalidating the cached resource request result and passing the first resource request to the REST web service, wherein determining that the entity from the set of entities has changed comprises checking the entity register to determine that a version of the entity has changed.

2. The method of claim 1, further comprising, in response to determining that all entities within the set of entities used to produce the resource request result have not changed since the resource request result was cached, returning the resource request result to the client.

3. The method of claim 1, further comprising:
with the computing system, receiving a second resource request; and
with the computing system, in response to determining that a result from the second resource request is not cached within the cache module, passing the second resource request to the REST web service.

4. The method of claim 1, with the computing system, receiving an update for the entity register from a persistence layer of the REST web service, the update indicating that an entity referenced within the entity register has changed.

5. The method of claim 4, further comprising, invalidating all cached results associated with the entity.

6. The method of claim 4, wherein determining that an entity from the set of entities has changed utilizes a monitoring module implemented with aspect oriented programming (AOP), the monitoring module configured to monitor the persistence layer.

7. The method of claim 1, wherein the resource request comprises a Universal Resource Identifier (URI).

8. The method of claim 1, wherein the computing system is configured to also provide the REST web service.

9. The method of claim 1, wherein the computing system is separate from and in communication with a computing system that provides the REST web service.

10. A system comprising:
a Representational State Transfer (REST) web service; and
a cache module configured to:
cache a resource request result from the REST web service;
store within an entity register associated with the cache module, metadata for the resource request result, the metadata including a set of entities used to produce the resource request result, wherein the metadata further includes a version of each entity associated with the resource request result and accessibility of each entity associated with the resource request result;
receive from a client, a first resource request for the REST web service, the first resource request corresponding to the resource request result;
in response to determining that the resource request result is cached within the cache module, check, within the entity register, the metadata used to produce the resource request result; and
in response to determining that an entity from the set of entities has changed since the resource request result was cached, invalidate the cached resource request result and passing the first resource request to the REST web service, wherein determining that the entity from the set of entities has changed comprises checking the entity register to determine that a version of the entity has changed.

11. The system of claim 10, wherein the cache module is further configured to, in response to determining that all entities within the set of entities used to produce the resource request result have not changed since the resource request result was cached, return the resource request result to the client.

12. The system of claim 10, wherein the cache module is further configured to:
receive a second resource request; and
in response to determining that a result from the second resource request is not cached within the cache module, pass the second resource request to the REST web service.

13. The system of claim 10, wherein the cache module is further configured to receive an update for the entity register from a persistence layer of the REST web service, the update indicating that an entity referenced within the entity register has changed.

14. The system of claim 13, wherein the cache module is further configured to invalidate all cached results associated with the entity.

15. The system of claim 13, further comprising, a monitoring module implemented with aspect oriented programming (AOP), the monitoring module configured to monitor the persistence layer.

* * * * *